United States Patent Office 3,708,278
Patented Jan. 2, 1973

3,708,278
METHOD FOR PREVENTING AND KILLING WEEDS IN RICE
Hiromu Okamoto, Kanagawa-ken, Takuo Ohi, Tokyo, Jyotaro Tamura, Hiratsuka-shi, Saburo Takahashi, Kamakura-shi, Hiroshi Oyama, Atsugi-shi, Hideo Ueda, Fujisawa-shi, Kunihiko Sasaki, Chigasaki-shi, and Hiromichi Ashikawa, Atsugi-shi, Japan, assignors to Hokko Chemical Industry Co., Ltd., Tokyo, Japan
No Drawing. Filed July 31, 1969, Ser. No. 846,599
Claims priority, application Japan, July 31, 1968, 43/53,592; Aug. 15, 1968, 43/57,617, 43/59,616; July 14, 1969, 44/55,073
Int. Cl. A01n 9/12
U.S. Cl. 71—100       2 Claims

ABSTRACT OF THE DISCLOSURE

Herbicidal compositions which may be used in the form of dust, emulsion, wettable powder, granule, aerosol and which contain, as an essential active ingredient, aryloxy-monothioacetic ester respresented by the general formula

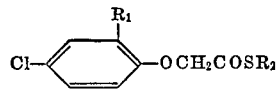

wherein $R_1$ stands for methyl radical and $R_2$ methyl or ethyl radical, or which contain in addition to above said essential active ingredient other weed killer selected from the group consisting of
2,4-dichlorophenyl-4-nitrophenyl ether
2,4,6-trichlorophenyl-4-nitrophenyl ether
2,4-dichloro-6-fluorophenyl-4-nitrophenyl ether
4,6-bis(ethylamino)-2-methylthio-1,3,5-triazine
4,6-bis(isopropylamino)-2-methylthio-1,3,5-triazine
4,5,7-trichlorobenzthiadiazole-2,1,3.

---

This invention relates to herbicidal compositions, particularly those very useful as weed preventive agents for rice field, which contain as essential active ingredient aryloxymonothiocarboxylic ester represented by the general Formula 1:

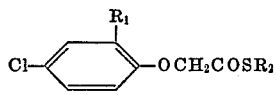     (1)

wherein $R_1$ stands for methyl radical and $R_2$ stands for methyl or ethyl radical, in particular aryloxymonothiocarboxylic S-ester or O-ester represented by the general Formulae 2 and 3:

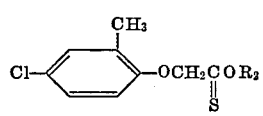     (2)

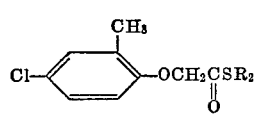     (3)

wherein $R_2$ is the same as mentioned above, or in combination with other weed killers.

For typical weeds which can not be effectively weeded by hitherto known herbicides for rice field, there may be mentioned *Eleocharis acicularis* and *Monochoria vaginalis*. The former *Eleocharis acicularis* is a perennial herb. The subterranean stems thereof spread in mud and from the nodes needle leaves grow densely and extend about 3–6 cm. in height above the earth. They grow thick with very high propagating power under proper temperature, sunlight and depth of water. The latter *Monochoria vaginalis* is also high propagating herb, in particular, violently grow at warm place to show frequently 50–60 cm. of root width. The capsule would have about 250 seeds and after maturation in autumn rupture by moisture and seeds are scattered and develope in wide area next spring. Main root of *Monochoria vaginalis* extend very quickly. On germination on the ground, their seed leaves are small but main root frequently extend already to 3 cm. They do not germinate all at once but germinate diversely over long period of time so that it is very difficult to kill them wholly. The weeds *Eleocharis acicularis* and *Monochoria vaginalis* which are weeded with very difficulty would pillage manures and fertilizers in soil, decrease the temperature of ground and suppress the growth of paddy-field rice plant to result in remarkable decrease in yield.

The herbicides such as, for example, 2,4-dichlorophenyl-4-nitrophenyl ether,
2,4,6-trichlorophenyl-4-nitrophenyl ether,
2,4-dichloro-6-fluorophenyl-4-nitrophenyl ether,
4,6-bis(ethylamino)-2-methylthio-1,3,5-triazine,
4,6-bis(isopropylamino)-2-methylthio-1,3,5-triazine and
4,5,7-trichlorobenzthiadiazols-2,1,3 inhibit very strong weed-killing power against *Panicum crusgalli* and general broad-leaved weeds which are main-weeds in paddly-field but inhibit remarkably inferior activity against the perennial weeds, *Eleocharis acicularis* and *Monochoria vaginalis*. Accordingly if these herbicides only are applied to irrigated paddy-field *Panicum crusgalli*, *Potamogeton distinctus* and other weeds except *Eleocharis acicularis* and *Monochoria vaginalis* are merely killed to disadvantageously result in appearance of the environmental conditions which are suitable for spread and violet growth of *Eleocharis acicularis* and *Monochoria vaginalis*.

Further 2,4-dichlorophenoxyacetic acid, 2-methyl-4-chlorophenoxyacetic acid and their derivatives are commonly known as the herbicides of horomone series having *Eleocharis acicularis*- and *Monochoria vaginalis*-killing activity. There herbicides have high weed-killing activity but would be accompanied with such disadvantages that they persent little selectivity and high harmful effect on paddy-field rice plant so that they cannot be used without restriction in the amount to be used and the time at which they are applied. These herbicides, therefore, must be applied in a decreased amount to a paddly-field lapsed for only a short time after transplantation in order to protect young seedlings of rice-plant from harmful effect at the sacrifice of their herbicidal activity. In general, until the period of unvoluable semiprostrate shoots (about 30–35 days after rice-transplantation) the amount of these herbicides would be diminished to a half the amount usually applied.

Basing upon the above investigations, we the inventors have synthesized a number of compounds and studied on these compounds to develope herbicides which effectively kill *Eleocharis acicularis* and have no harmful effect on rice plant. From our study we have found that aryloxymonothiocarboxylic ester represented by the above Formula 1 is extremely suited for above purpose. That is to say, we have found that the compounds represented by the Formula 1 have very high *Eleocharis acicularis*- and *Monochoria vaginalis*-killing activity and show much higher herbicidal activity than that of widely utilized aryloxycarboxylic acid and derivatives thereof and further powerfully act on general broad-leaved weeds in the paddyfield but show little harmful effect on rice plant, accordingly they are ideal herbicide group.

The compounds represented by the Formula 1 include the following four compounds.

2-methyl - 4 - chlorophenoxymonothioacetic O-methylester (slight yellowish oily compound, B.P. 105–106° C./0.5 mm. Hg)

2-methyl - 4 - chlorophenoxymonothioacetic O-ethylester (slight yellowish oily compound, B.P. 110–112° C./0.5 mm. Hg)

2-methyl-4-chlorophenoxymonothioacetic S-methylester (white crystal, M.P. 69–70° C.)

2-methyl-4-chlorophenoxymonothioacetic S-ethylester (white crystal, M.P. 41–42° C.)

These compounds may be easily produced by, for instance, the following methods.

(1) 2-methyl - 4 - chlorophenoxyacetonitrile is reacted with methyl (or ethyl) alcohol and hydrogen chloride and imino ether hydrochloride thus produced is reacted with hydrogen sulfide to give corresponding O-methyl (or ethyl) ester.

(2) 2-methyl - 4 - chlorophenoxyacetonitrile is reacted with methyl (or ethyl) mercaptan and hydrogen chloride and iminothioether hydrochloride thus produced is reacted with water to give corresponding S-methyl (or ethyl) ester.

(3) 2-methyl - 4 - chlorophenoxymonothioactic metal salt is subjected to condensation with methyl (or ethyl) halide to give corresponding S-methyl (or ethyl) ester.

(4) 2-methyl - 4 - chlorophenoxyacetyl halide is reacted with methyl (or ethyl) mercaptin in the presence of acid bonding agent to give corresponding S-methyl (or ethyl) ester.

Further, we have repeatedly examined on the herbicidal activity of a mixture of the compound (1) and other herbicides in order to develope some herbicides which inhibit herbicidal activity on wide range of weeds in cooperation with herbicidal characteristic of the compound represented by the Formula 1. From our repeated examinations, we have found such unexpected results that aryloxymonothiocarboxylic ester (1) may be used alone as an active ingredient of the herbicide as mentioned above and that when said compound (1) is used in combination with other specific herbicide, the kind of weed which can be killed is not only mathematically extended in wide range but also the herbicidal activity may be synergetically increased so that the use of the mixture is extremely inexpensive comparing with individual use of each ingredient.

The herbicidal compositions which kill, by synergetic activity, effectively *Eleocharis acicularis* and *Monochoria vaginalis* as well as whole of harmful weeds in the paddyfield simultaneously but give no harmful effect on rice plant may be provided by mixing main active ingredient aryloxymonothiocarboxylic ester represented by the Formula 1 with the following compounds.

2,4-dichlorophenyl-4-nitrophenyl ester
2,4,6-trichlorophenyl-4-nitrophenyl ester
2,4-dichloro-6-fluorophenyl-4-nitrophenyl ester
4,6-bis(ethylamino)-2-methylthio-1,3,-triazine
4,6-bis(isopropylamino)-2-methylthio-1,3,5-triazine
4,5,7-trichlorobenzthiadiazole-2,1,3

According to the present invention, the herbicidal compositions may be diluted at will, by the conventional methods in accordance with their uses and places for use, with various carrier and adjuvants to practically use in the form of, for instance, dust, emulsion, wettable powder, granule, aerosol and the like.

The present invention will be explained more in detail by way of examples as follows:

Example 1: (granule and its use)

| | Parts |
|---|---|
| 2 - methyl - 4 - chlorophenoxymonothioacetic S-ethylester | 1.4 |
| Clay | 81.6 |
| Bentonite | 15.0 |
| Sodium dodecylbenzenesulfonate | 2.0 |

Above ingredients were uniformly mixed, added with suitable amount of water, uniformly kneaded with a kneading machine, passed through a granulating apparatus and air-dried by a flow drier to give granules containing 1.4% of 2 - methyl - 4 - chlorophenoxymonothioacetic-S-ethylester. Application of the granules of 300 g./are killed effectively the weeds such as *Eleocharis acicularis, Lindernia pyxidaria, Ludwigia prostrata, Sagittaria pygmaea* but gave no harmful effect on paddy-field rice plant.

Example 2: (original liquid for emulsion and its use)

| | Parts |
|---|---|
| 2-methyl - 4 - chlorophenoxymonothioacetic-S-methylester | 40 |
| Cyclohexanone | 30 |
| Polyoxyethylenenonylphenylether | 30 |

Above ingredients were homogeneously mixed to give an original liquid for emulsion containing 40% of 2-methyl - 4 - chlorophenoxymonothioacetic-S-methylester. Application of diluted emulsion of 12–15 g./are of this liquid in about 10 l. of water inhibited the same herbicidal effect as in the Example 1.

Example 3: (mixed granules and its use)

| | Parts |
|---|---|
| 2,4 - dichlorophenyl - 4 - nitrophenylether | 7.0 |
| 2 - methyl - 4 - chlorophenoxymonothioacetic-S-ethylester | 0.7 |
| Clay | 75.3 |
| Bentonite | 15.0 |
| Sodium dodecylbenzenesulfonate | 2.0 |

Above ingredients were uniformly mixed, add with suitable amount of water, uniformly kneaded with a kneading machine, passed through a granulating apparatus and air-dried by a flow drier to give mixed granules containing 0.7% of 2-methyl-4-chlorophenoxymonothioacetic-S-ethylester and 7% of 2,4-dichlorophenyl-4-nitrophenylether. Application of the mixed granules of 300 g./are killed completely about all weeds in paddy-field, for example, *Echinochloa crusgalli* var. *frumentarea, Monochoria vaginalis, Eleochoria acicularis, Rotala indica, Doparium junceum, Ludwigia prostrata, Lindernia pyxidaria, Aneilema keisak, Elatine trianara, Lobelia chinensis* but gave no harmful effect on paddy-field rice plant.

Herbicidal effect of the present compositions will be explained more in detail by the following experimental examples.

Experimental Example 1

Herbicidal effect on weeds in paddy-field.

Experimental method 100 grains of *Panicum crusgalli* seed and a fixed amount of *Ludwigia prostrata, Cyperus microria, Monochoria vaginalis, Doporium junceum* seeds as well as 50 ground rhizomes branced from *Eleocharis acicularis* were mixed with surface layer of soil in 1/2000 are pot, irrigated and on 7th day after inoculation treated with the herbicidal agents. The treated pot was put in a greenhouse and after three weeks number of each weeds grown was investigated and shown by exponent against 100 in untreated section. The samples of agents used were prepared by diluting the original liquids containing each 40% of the compounds to be tested with about 800 times of water, said original liquids being prepared in accordance with Example 2. The experimental results were shown in the column of the Table 1 below in which herbicidal effect test results were listed.

Experimental Example 2

Test on harmful effect against paddy-field rice plant.

The harmful effects of the herbicides on paddy-field rice plant were compared by the tests on prevention for growth of rice plant in irrigation under decreased depth of water condition and on root absorption of paddy-field rice plant by water culture with diluted chemical solution. The samples of herbicides used were prepared by diluting the original liquids (prepared in accordance with Example 2) containing each 40% of the compounds to be tested with about 800 times of water. Two paddy-field rice plant at three leaves age (height of 15–16 cm.) uniformly grew were transplanted in $\frac{1}{5000}$ are irrigated Wagner pot contained diluvial volcanic ashy soil (loam soil). On 4th day after transplantation, the diluted emulsion was uniformly sprayed onto the pot under decreased depth of water 3 cm./24 hrs. On 30th day after spraying, the living body weight of ground rice plants were measured to evaluate the extent of harmful effect looking for each ratio (%) to untreated section (control). The results were shown in the column of the Table 1 below in which harmful effect test results were listed.

It is clear from the Table 1, that the compounds represented by the general Formula 1 of this invention have remarkably low harmful effect on the rice plant comparing with the known herbicides controls and inhibit very high herbicidal effect on *Panicum crusgalli, Cyperus microiria, Ludwigia prostrata, Eleocharis acicularis, Monochoria vaginalis, Doposium junceum*.

Experimental Example 3

Tests on herbicidal effect against *Eleocharis acicularis*.

The herbicidal effects of mixtures of aryloxymonothioacetic esters and other known herbicidal compounds on *Eleocharis acicularis* were tested by the following method.

50 plants of *Eleocharis acicularis* uniformly grew were mixed with surface layer of alluvial clayey soil in Wagner pot (area $\frac{1}{5000}$ are) and kept under irrigated condition of 3 cm. depth of water. Various agent solutions to be tested were prepared by mixing various original emulsions containing 40 parts of active ingredients, 30 parts of cyclohexane and 30 parts of polyoxyethylene-nonylphenyl ether with each other and diluting the emulsions with water. These agent solutions were applied on 4th day after the irrigation. On 28th day after the application, numbers of needles of survival *Eleocharis acicularis* were investigated and herbicidal activity ratio was calculated by the following formula:

Herbicidal activity ratio $$= \frac{\text{average number of needles in untreated section} - \text{average number of needles in treated section}}{\text{average number of needles in untreated section}} \times 100(\%)$$

TABLE 1

| Test compounds General Formula (1) | Amount applied (ingredient, g./a.) | Herbicide effect test result — Ratio of numbers of growth of weeds | | | | | | Amount applied (ingredient, g./a.) | Harmful effect test result — Ratio of living body weight (percent) |
|---|---|---|---|---|---|---|---|---|---|
| | | A | B | C | D | E | F | | |
| Present invention: | | | | | | | | | |
| $CH_3\overset{O}{\underset{\|}{C}}SCH_3$ | 3 | 0 | 0 | 0 | 0 | 0 | 0 | 4 | 100 |
| | 1 | 4 | 19 | 0 | 10 | 16 | 0 | 2 | 100 |
| $CH_3\overset{S}{\underset{\|}{C}}OCH_3$ | 3 | 0 | 0 | 0 | 0 | 0 | 0 | 4 | 100 |
| | 1 | 7 | 28 | 7 | 16 | 20 | 0 | 2 | 100 |
| $CH_3\overset{O}{\underset{\|}{C}}SC_2H_5$ | 3 | 0 | 0 | 0 | 0 | 0 | 0 | 4 | 100 |
| | 1 | 2 | 15 | 0 | 8 | 0 | 0 | 2 | 100 |
| $CH_3\overset{S}{\underset{\|}{C}}OC_2H_5$ | 3 | 0 | 0 | 0 | 0 | 0 | 0 | 4 | 100 |
| | 1 | 4 | 17 | 0 | 10 | 10 | 0 | 2 | 100 |
| Controls: | | | | | | | | | |
| $CH_3\overset{O}{\underset{\|}{C}}SH$ | 3 | 80 | 92 | 47 | 100 | 58 | 36 | 4 | 100 |
| | 1 | 100 | 100 | 100 | 100 | 94 | 86 | 2 | 100 |
| $Cl\overset{O}{\underset{\|}{C}}SH$ | 3 | 94 | 100 | 65 | 100 | 71 | 58 | 4 | 100 |
| | 1 | 100 | 100 | 100 | 100 | 97 | 95 | 2 | 100 |
| $CH_3\overset{O}{\underset{\|}{C}}OC_2H_5$ | 3 | 0 | 0 | 0 | 2 | 0 | 0 | 4 | 54 |
| | 1 | 5 | 31 | 0 | 13 | 15 | 0 | 2 | 89 |
| $Cl\overset{O}{\underset{\|}{C}}OC_2H_5$ | 3 | 0 | 1 | 0 | 8 | 2 | 0 | 4 | 50 |
| | 1 | 15 | 43 | 19 | 30 | 26 | 11 | 2 | 88 |
| $Cl\overset{O}{\underset{\|}{C}}SC_4H_9(n)$ | 3 | 22 | 7 | 0 | 25 | 16 | 0 | 4 | 100 |
| | 1 | 75 | 40 | 18 | 67 | 51 | 14 | 2 | 100 |
| Untreated sections | | 100 | 100 | 100 | 100 | 100 | 100 | | 100 |

NOTE.—A, B, C, D, E, F in the table stand for the following weeds: A=*Panicum crusgalli*, B=*Cyperus microiria*, C=*Ludwigia prostrata*, D=*Eleocharis acicularis*, E=*Zonocharia vaginalis*, F=*Doporium junceum*.

The results were shown in Table 2.

TABLE 2

| Test compounds | Amount applied (ingredient g./a.) | Herbicidal ratio (percent) |
|---|---|---|
| 2'4-dichlorophenyl-4-nitrophenylether (a) | 5.0 | 8 |
| 2-methyl-4-chlorophenoxymonothio acetic S-methylester | 0.5 | 25 |
| 2-methyl-4-chlorophenoxymonothio-acetic S-methylester +(a) | 0.5 + 5.0 | 46 |
| 4,6-bis(isopropylamino)-2-methylthio-1,3,5-triazine (b) | 1.5 | 13 |
| 2-methyl-4-chlorophenoxymonothio-acetic S-methylester +(b) | 0.5 + 1.5 | 52 |
| 2-methyl-4-chlorophenoxymonothio-acetic O-methylester | 0.5 | 20 |
| 4,6-bis(ethylamino)-2-methylthio-1,3,5-triazine (c) | 1.5 | 13 |
| 2-methyl-4-chlorophenoxymonothio-acetic O-methylester +(c) | 0.5 + 1.5 | 46 |
| 2,4,6-trichlorophenyl-4-nitrophenyl-ether (d) | 5.0 | 10 |
| 2-methyl-4-chlorophenoxymonothio-acetic S-ethylester | 0.5 | 26 |
| 2-methyl-4-chlorophenoxymonothio-acetic S-ethylester +(d) | 0.5 + 5.0 | 54 |
| 2,4-dichloro-6-fluorophenyl-4-nitrophenylester (e) | 2.5 | 12 |
| 2-methyl-4-chlorophenoxymonothio-acetic S-ethylester +(e) | 0.5 + 2.5 | 61 |

Experimental Example 4

Tests on herbicidal effect against *Monochoria vaginalis*.

Each 200 grains of *Monochoria vaginalis* seeds were sowed in each of irrigation pots, area 1/5000 are. On germination of said seeds, they were treated with the agent solutions prepared by the same method as in Experimental Example 3. When said seeds grew to appearance of 1st real leaves dry weights of plant above the soil were measured and herbicidal activity ratio were calculated. The herbicidal activity ratio in case a mixture of various herbicidal ingredients was applied was compared with that in case each ingredients were applied individually.

The results were shown in Table 3.

TABLE 3

| Test compounds | Amount applied (ingredient g./a.) | Preventive ratio (percent) |
|---|---|---|
| 4,6-bis(ethylamino)-2-methylthio-1,3,5-triazine (c) | 2.4 | 7 |
| 2-methyl-4-chlorophenoxymonothio-acetic O-ethylester +(c) | 0.6 + 2.4 | 42 |
| 4,6-bis(isopropylamino)-2-methylthio-1,3,5-triazine (b) | 2.4 | 6 |
| 2-methyl-4-chlorophenoxymonothio-acetic-S-methylester | 0.6 | 24 |
| 2-methyl-4-chlorophenoxymonothio-acetic-S-methylester +(b) | 0.6 + 2.4 | 39 |
| 4,5,7-trichlorobenzthiadiazole-2,1,3 (f) | 5.0 | 7 |
| 2-methyl-4-chlorophenoxymonothio-acetic-S-methylester | 0.5 | 21 |
| 2-methyl-4-chlorophenoxymonothio-acetic-S-methylester +(f) | 0.5 + 5.0 | 42 |

As it is clear from this table, high synergetic effects were observed in the application of mixed ingredients.

The results shown in Tables 2 and 3 proves clearly the fact that the mixed herbicidal agents of aryloxymonothioacetic ester represented by the Formula 1 and other herbicides inhibit high synergetic herbicidal effect on *Eleocharis acicularis* and *Monochoria vaginalis*.

The rate of the active ingredient contained in the herbicidal compositions of the present invention varies depending upon the various factors such as agent-forms, application times, application methods, places, objects etc. and it is difficult to define said rate exactly. The present herbicidal compositions may be applied by ultra-low-volume process. For example, the compositions of the present invention may be sprayed in high concentration in the form of commercial original state as it is or pure substance.

In order to effectively prevent and kill the paddy-field weeds, it is preferable to apply the essential active ingredient aryloxymonothioacetic ester represented by Formula 1 in the amount of 1–20 g. alone and 0.5–10 g. in combination with other herbicidal compounds per 1 are of paddy-field respectively.

The amount of the other herbicidal compounds enough for mixing with the present compounds of Formula 1 is merely ¼–½ of the usual amount when the other herbicidal compounds are applied alone. The desirable amounts of the following herbicidal compounds per 1 are of paddy-field are shown as follows:

|  | G./a. |
|---|---|
| 2,4-dichlorophenyl-4-nitrophenyl ether | 5–30 |
| 2,4,6-trichlorophenyl-4-nitrophenyl ether | 5–30 |
| 2,4,-dichloro - 6 - fluorophenyl - 4 - nitrophenyl ether | 2.5–15 |
| 4,6 - bis(ethylamino) - 2 - methylthio - 1,3,5 - triazine | 1.5–10 |
| 4,6 - bis(isopropylamino) - 2 - methylthio-1,3,5-triazine | 1.5–10 |
| 4,5,7-trichlorobenzthiadiazole-2,1,3 | 5–30 |

We claim:

1. Method for preventing and killing harmful weeds in rice fields without harm to the rice including the step of applying herbicidal compositions comprising as essential active ingredient, aryloxymonothioacetic ester represented by the general formula

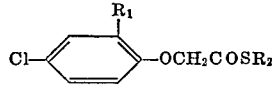

wherein $R_1$ stands for methyl radical and $R_2$ stands for methyl or ethyl radical.

2. Method claimed in claim 1 in which aryloxymonothioacetic acid ester is applied in an amount of 1–20 g. per 1 acre of the rice field.

References Cited

UNITED STATES PATENTS 3,445,221   5/1969   Regel _____ 71—100

FOREIGN PATENTS 7,700,063   3/1957   Great Britain _____ 71—100

JAMES O. THOMAS, Jr., Primary Examiner

U.S. Cl. X.R.

71—90, 93, 124